(Model.)
J. H. RUNYAN.
DOOR CHECK.
No. 295,507. Patented Mar. 18, 1884.
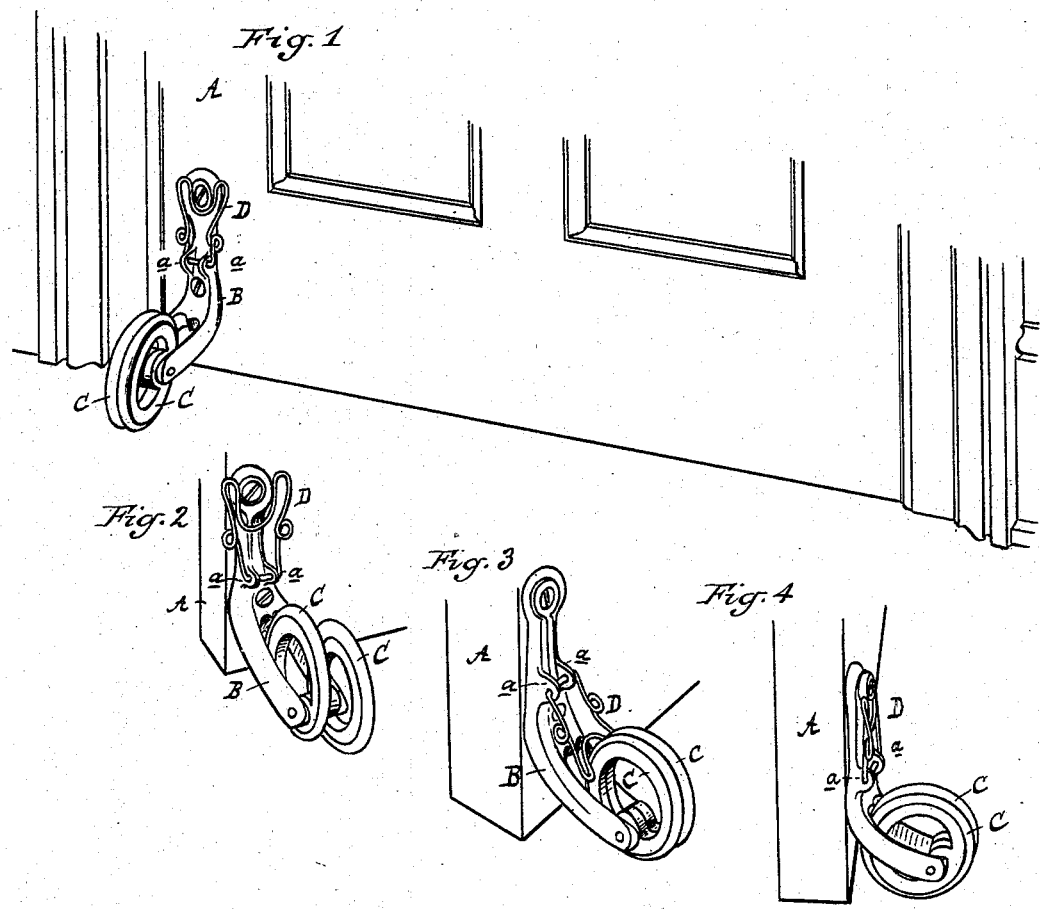
Attest:
A. Barthel
E. Scully
Inventor:
John H. Runyan
by his Att'y

UNITED STATES PATENT OFFICE.

JOHN H. RUNYAN, OF FLINT, MICHIGAN.

DOOR-CHECK.

SPECIFICATION forming part of Letters Patent No. 295,507, dated March 18, 1884.

Application filed August 27, 1883. (Model.)

*To all whom it may concern:*

Be it known that I, JOHN H. RUNYAN, of Flint, in the county of Genesee and State of Michigan, have invented new and useful Improvements in Door-Stops; and I do hereby declare that the following is a full, clear, and exact description thereof, reference being had to the accompanying drawings, which form a part of this specification.

The nature of this invention relates to certain new and useful improvements in the construction of stops to be attached to swinging doors, by means of which the door may be secured in any desired position against the action of drafts of air, and by means of which, also, the door is provided with a stop, to prevent injurious contact with the wall against which it may swing.

The invention consists in the peculiar construction of parts and their combination, as more fully hereinafter described.

Figure 1 is a perspective of a section of a door and its frame, and of my attachment secured to said door and holding the same against pressure from the opposite side. Fig. 2 shows the device, in perspective, attached to a section of a door partially opened and secured against movement in either direction. Fig. 3 is a like view, showing the device, when not in operation, supported in a yoke simply to act as a bumper to prevent the door from injuriously coming in contact with the wall. Fig. 4 is a like view, showing the device attached to a door opened and secured against closing.

In the accompanying drawings, which form a part of this specification, A represents a section of a door, to the lower left-hand or opening corner of which is secured the cast-metal bracket B by means of screws or otherwise. The foot of this bracket is bifurcated, as shown, and between the two ends of said foot are journaled two grooved wheels, C, of equal diameter, both being journaled at one side of the axis, to compel them to operate eccentrically. A round rubber ring is sprung into the grooves of these wheels, to form a shoe or tire to prevent the action of the wheels doing any injury to the carpentry or the walls against which their peripheries may be brought in contact. The bracket is provided with a pair of ears, *a*, to which is pivotally secured the spring-bracket D, made preferably in the form shown in Figs. 1, 2, and 3, although any other suitable form may be adopted, if preferred. The bracket, with its wheels, being secured to the door, both wheels being coincident, as shown in Fig. 1, will hold the door against pressure from the opposite side. When it is desired to open the door, the wheels should be rotated upwardly and toward the door, to disengage their rims from the floor, the door being opened partially, as shown in Fig. 2; and it being desired to secure it in that position, one of the wheels is thrown forward upon its journal and the other to the rear, when the purpose is accomplished. When it is desired to hold the door against pressure that would tend to close it when opened, the wheels are coincident, in the manner shown in Fig. 4. When it is desired to not employ the wheels for holding the door in position, they are rotated until in the position shown in Fig. 3, in which they are held by the spring-bracket D, as shown in Fig. 3, when, in this latter case, the device simply becomes a buffer, to prevent injurious contact between the door and the wall.

What I claim as my invention is—

In a door-stop, and in combination with the bracket and eccentrically-journaled wheels, constructed substantially as described, the spring-bracket D, substantially as and for the purposes set forth.

JOHN H. RUNYAN.

Witnesses:
 H. S. SPRAGUE,
 E. SCULLY.